US012542993B2

(12) United States Patent
Park et al.

(10) Patent No.: US 12,542,993 B2
(45) Date of Patent: Feb. 3, 2026

(54) ELECTRONIC DEVICE INCLUDING SOUND MODULE

(71) Applicant: Samsung Electronics Co., Ltd., Suwon-si (KR)

(72) Inventors: Youngbae Park, Suwon-si (KR); Joonrae Cho, Suwon-si (KR); Jihoon Song, Suwon-si (KR); Byounghee Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 279 days.

(21) Appl. No.: 18/499,653

(22) Filed: Nov. 1, 2023

(65) Prior Publication Data

US 2024/0064457 A1 Feb. 22, 2024

Related U.S. Application Data

(63) Continuation of application No. PCT/KR2022/005593, filed on Apr. 19, 2022.

(30) Foreign Application Priority Data

May 6, 2021 (KR) ........................ 10-2021-0058336

(51) Int. Cl.
*H04R 1/02* (2006.01)
*H04R 1/28* (2006.01)
(Continued)

(52) U.S. Cl.
CPC ........... *H04R 1/2811* (2013.01); *H04R 1/025* (2013.01); *H04R 2400/03* (2013.01); *H04R 2499/11* (2013.01)

(58) Field of Classification Search
CPC .......... H04R 1/02; H04R 1/025; H04R 1/021; H04R 1/10; H04R 1/1058; H04R 1/1075;
(Continued)

(56) References Cited

U.S. PATENT DOCUMENTS 7,974,433 B2 * 7/2011 Andersen ................. H04R 7/20 381/396
9,820,038 B2 * 11/2017 Salvatti .................... H04R 1/44
(Continued)

FOREIGN PATENT DOCUMENTS

CN 207083220 U * 3/2018
CN 207475845 U * 6/2018
(Continued)

OTHER PUBLICATIONS

International Search Report for PCT/KR2022/005593 mailed Aug. 8, 2022, 4 pages.
(Continued)

*Primary Examiner* — Edgardo San Martin
(74) *Attorney, Agent, or Firm* — Nixon & Vanderhye, P.C.

(57) ABSTRACT

Disclosed is an electronic device including a sound module. The electronic device comprises: a housing in which at least one sound hole is formed; and a sound component mounted on the housing adjacent to the sound hole and configured to emit sound in a first direction toward the outside of the housing through the sound hole. The sound component includes: a sound frame forming a front surface open in the first direction; a center diaphragm disposed in the front space such that the front surface thereof faces the first direction; a vibration module including a loop disposed on the rear surface of the center diaphragm and configured to apply vibrations to the center diaphragm; and a sealing part including a seal that connects the center diaphragm and the sound frame along the circumference of the center diaphragm and provides a seal between the housing and the sound frame through a portion connected to the sound frame, wherein the sound frame and the center diaphragm may include the same material.

20 Claims, 13 Drawing Sheets

(51) Int. Cl.
*H04R 7/04* (2006.01)
*H04R 7/20* (2006.01)
*H04R 31/00* (2006.01)

(58) Field of Classification Search
CPC .. H04R 1/1091; H04R 1/2811; H04R 1/2807; H04R 1/28; H04R 7/02; H04R 7/04; H04R 7/16; H04R 7/18; H04R 7/20; H04R 7/22; H04R 9/02; H04R 31/00; H04R 31/003; H04R 31/006; H04R 2400/03; H04R 2400/11; H04R 2499/11; H04R 2499/15
See application file for complete search history.

(56) References Cited

U.S. PATENT DOCUMENTS

| | | | | |
|---|---|---|---|---|
| 10,291,997 | B2 | 5/2019 | Cai et al. | |
| 10,433,053 | B2 | 10/2019 | Kim | |
| 10,595,105 | B2 | 3/2020 | Amae | |
| 10,595,107 | B2 * | 3/2020 | Vitt | H04R 9/025 |
| 10,911,848 | B2 * | 2/2021 | Yoon | H04R 31/00 |
| 11,277,693 | B1 * | 3/2022 | He | H04R 1/025 |
| 11,681,327 | B2 * | 6/2023 | Crowley | H04R 1/025 381/388 |
| 11,780,131 | B2 * | 10/2023 | Cen | B29C 45/14475 264/260 |
| 11,962,962 | B2 * | 4/2024 | Cai | H04R 7/04 |
| 12,192,721 | B2 * | 1/2025 | Zhang | H04R 9/06 |
| 12,356,171 | B2 * | 7/2025 | Zhang | H04R 9/046 |
| 2008/0053745 | A1 * | 3/2008 | Tada | H04R 7/127 181/165 |
| 2013/0156218 | A1 | 6/2013 | Annacone et al. | |
| 2014/0360806 | A1 * | 12/2014 | Qingshan | H04R 7/18 181/172 |
| 2016/0241938 | A1 | 8/2016 | Huang et al. | |
| 2018/0063637 | A1 | 3/2018 | Choi et al. | |
| 2018/0167735 | A1 | 6/2018 | Luzzato et al. | |
| 2019/0069056 | A1 | 2/2019 | Yoon et al. | |
| 2022/0182763 | A1 * | 6/2022 | Nam | H04R 31/003 |
| 2024/0298100 | A1 * | 9/2024 | Park | G04G 21/00 |
| 2025/0142252 | A1 * | 5/2025 | Rao | H04R 7/20 |
| 2025/0142261 | A1 * | 5/2025 | Rao | H04R 9/02 |

FOREIGN PATENT DOCUMENTS

| | | | | | |
|---|---|---|---|---|---|
| CN | 210168213 | U | * | 3/2020 | |
| CN | 111131972 | A | * | 5/2020 | H05K 5/066 |
| CN | 212392983 | U | * | 1/2021 | H04R 1/20 |
| CN | 112468938 | | | 3/2021 | |
| CN | 112468938 | A | * | 3/2021 | H04R 7/12 |
| CN | 114630217 | A | * | 6/2022 | H04R 9/025 |
| JP | 2007060107 | A | | 3/2007 | |
| KR | 101489765 | B1 | | 2/2015 | |
| KR | 20190021056 | A | | 3/2019 | |
| KR | 20200072056 | A | | 6/2020 | |
| KR | 20220079737 | A | * | 6/2022 | H04R 7/04 |
| WO | WO-2021027227 | A1 | * | 2/2021 | H04R 7/04 |
| WO | WO-2024155285 | A1 | * | 7/2024 | H04R 7/20 |

OTHER PUBLICATIONS

Written Opinion of the ISA for PCT/KR2022/005593 mailed Aug. 8, 2022, 4 pages.

Extended European Search Report dated Jul. 24, 2024 issued in European Patent Application No. 227990256.6.

* cited by examiner

ELECTRONIC DEVICE INCLUDING SOUND MODULE

CROSS-REFERENCE TO RELATED APPLICATIONS

This application is a continuation of International Application No. PCT/KR2022/005593 designating the United States, filed on Apr. 19, 2022, in the Korean Intellectual Property Receiving Office and claiming priority to Korean Patent Application No. 10-2021-0058336, filed on May 6, 2021, in the Korean Intellectual Property Office, the disclosures of each of which are incorporated by reference herein in their entireties.

BACKGROUND

Field

The disclosure relates to an electronic device including a sound component.

Description of Related Art

An electronic device including a smartphone, a wearable device, a tablet personal computer (PC), and the like may include a sound component for emitting sounds. The sound component may be mounted in a housing of the electronic device to emit sounds through a sound hole formed in the housing. A sound component may include a waterproof structure for preventing/reducing a foreign substance from entering through the sound hole while mounted in the housing.

An electronic device for autonomously emitting a sound may include a sound component (e.g., a speaker or a receiver) configured to autonomously generate a sound wave through vibration according to an applied signal, and the sound wave generated by the sound component may be emitted to the outside through a sound hole formed in the electronic device. When the sound component is mounted in the electronic device, it is necessary to implement a waterproof structure to prevent/reduce an internal component or the sound component of the electronic device from being damaged by a foreign substance or moisture introduced through the sound hole. In particular, a technique for reducing production costs by simplifying a manufacturing process required to implement a waterproof structure while securing sufficient waterproof performance and the required performance of a sound component is required.

SUMMARY

Embodiments of the disclosure may provide a manufacturing process that may be simplified by forming a frame forming the external appearance of sound components and a center diaphragm (e.g., a center dome) that vibrates by receiving vibration using the same material at once.

Embodiments of the disclosure may provide a manufacturing process that may be simplified by simultaneously implementing a vibration function for generating a sound and a sealing function for waterproofing through a single component manufactured by a single process.

According to various example embodiments, an electronic device includes: a housing having at least one sound hole formed therein; and a sound component mounted on the housing to be adjacent to the sound hole and configured to emit a sound in a first direction toward the outside of the housing through the sound hole, wherein the sound component may include a sound frame configured to form a front space open in the first direction; a center diaphragm disposed in the front space such that a front surface thereof faces the first direction; a vibration module comprising a loop disposed on a rear surface of the center diaphragm and configured to apply vibration to the center diaphragm; and a seal configured to connect the center diaphragm and the sound frame along a circumference of the center diaphragm and seal a space between the housing and the sound frame through a portion connected to the sound frame, wherein the sound frame and the center diaphragm may include a same material.

According to various example embodiments, a sound component mounted on an electronic device includes a sound frame configured to form a front surface open in a first direction toward a sound hole formed in a housing of the electronic device, the sound frame including a first material; a center diaphragm comprising the first material, disposed in the front space such that a front surface thereof may face the first direction, and spaced apart from the sound frame; a seal including a vibration part configured to connect the center diaphragm and the sound frame along a circumference of the center diaphragm and acoustically coupled to the center diaphragm to vibrate, and a sealing part configured to protrude from the sound frame to seal a space between the housing and the sound frame; and a vibration module comprising a loop disposed on a rear surface of the center diaphragm and configured to apply vibration to the center diaphragm.

According to various example embodiments, a sound module manufacturing method of molding a sound module through double injection, the sound module including a sound frame configured to form a front space open in a first direction, a center diaphragm disposed in the front space such that a front surface thereof faces the first direction, and a vibration portion configured to connect the center diaphragm and the sound frame, includes: a first injection operation of integrally molding the sound frame and the center diaphragm by injecting a first material for primary molding, in a state in which a first moving mold is coupled to a fixed mold, and a second injection operation of molding the vibration portion integrally connected to the sound frame and the center diaphragm by injecting a second material for secondary molding, in a state in which the first moving mold is decoupled from the fixed mold and a second moving mold is coupled to the fixed mold, wherein in the second injection operation, the vibration portion may be formed to include a vibration part configured to connect the sound frame and the center diaphragm along a circumference of the center diaphragm, and a sealing part configured to protrude in at least one direction along a circumference of the sound frame.

According to various example embodiments, a manufacturing process required to implement a waterproof structure of a sound component may be simplified by forming a sound frame and a center diaphragm using the same material, injecting a sealing portion, and integrally connecting the sealing portion to the sound frame and the center diaphragm.

According to various example embodiments, an installation space required for a sound frame to install a separate sealing member may be omitted/reduced by simultaneously performing a vibration function and a sealing function through an integrally formed sealing portion.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
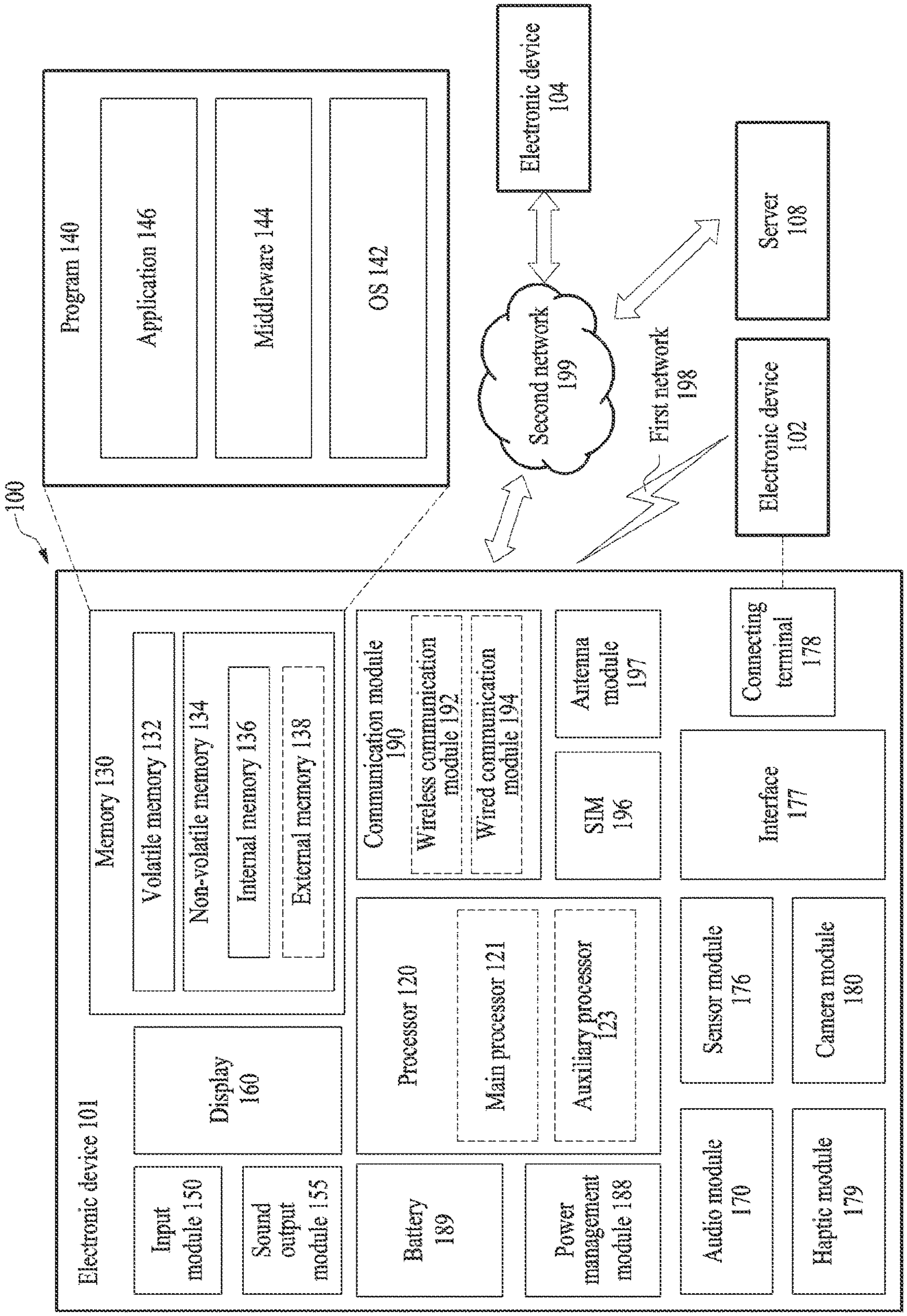
FIG. 1 is a block diagram illustrating an example electronic device in a network environment according to various embodiments.

Hereinafter, example embodiments will be described in greater detail with reference to the accompanying drawings. When describing the example embodiments with reference to the accompanying drawings, like reference numerals may refer to like elements and a repeated description related thereto may not be provided.

FIG. 1 is a block diagram illustrating an example electronic device in a network environment according to various embodiments.

Referring to FIG. 1, an electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In embodiments, at least one (e.g., the connecting terminal 178) of the above components may be omitted from the electronic device 101, or one or more other components may be added in the electronic device 101. In embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smart phone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “at least one of A, B, or C”, each of which may include any one of the items listed together in the corresponding one of the phrases, or all possible combinations thereof. Terms such as “first”, “second”, or “first” or “second” may simply be used to distinguish the component from other components in question, and do not limit the components in other aspects (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic”, “logic block”, “part”, or “circuitry”. A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
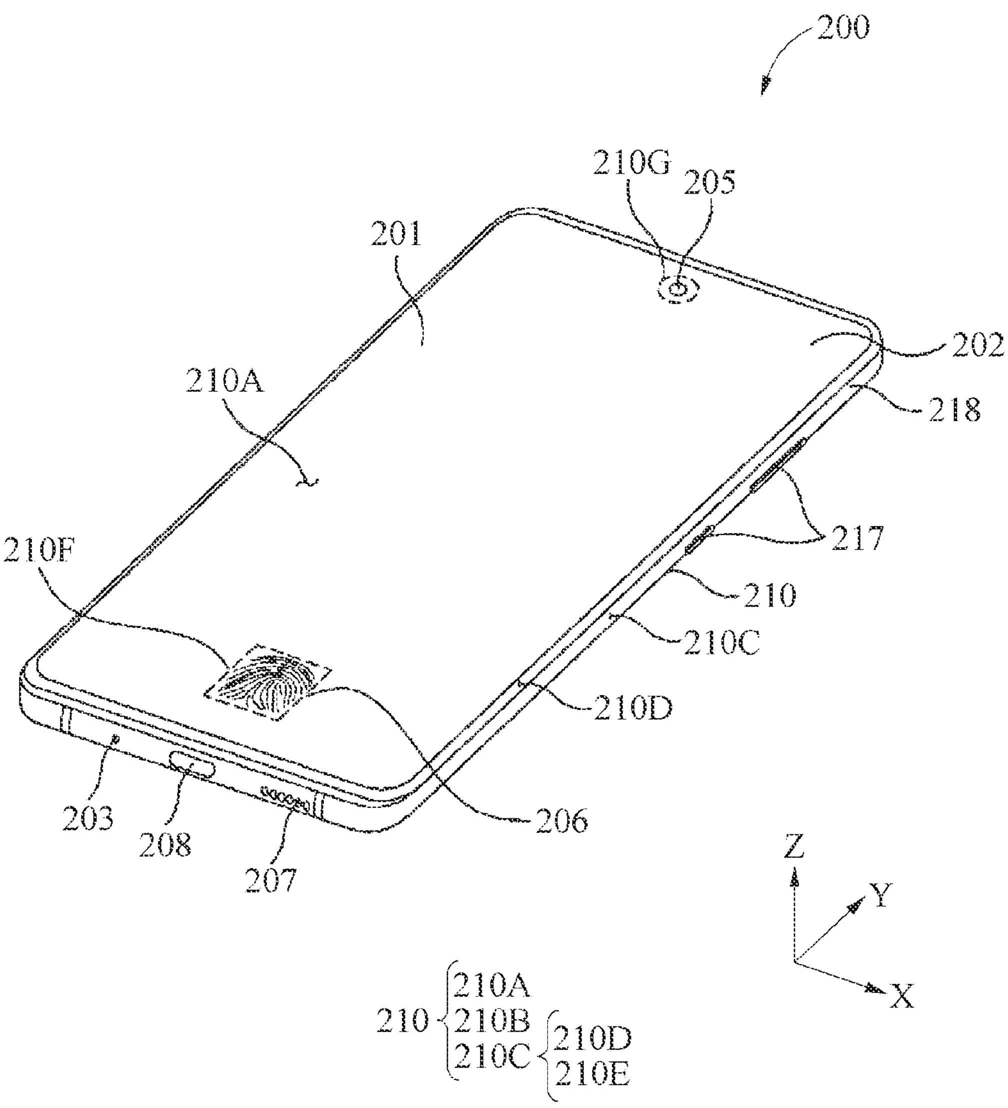
FIGS. 2A and 2B are front and rear perspective views, respectively, of an electronic device according to various embodiments.
Figure 2B:
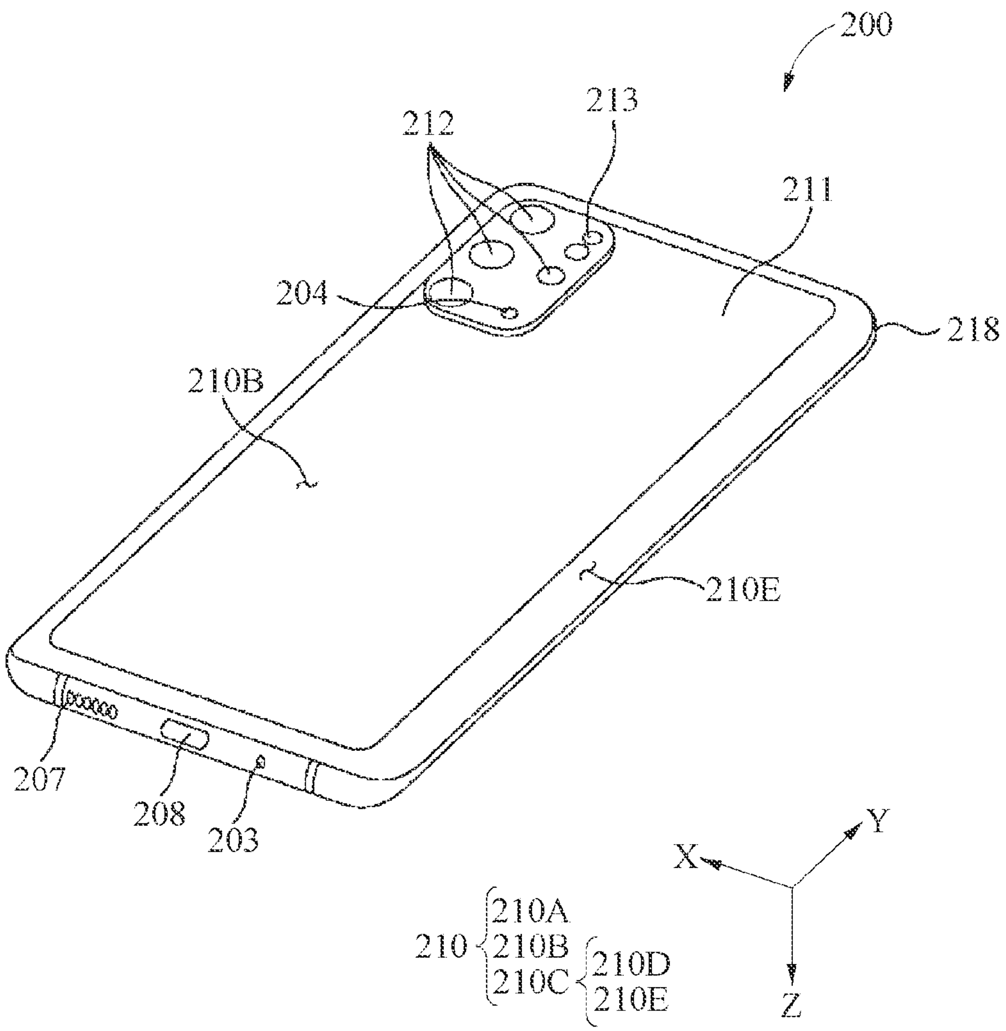

FIGS. 2A and 2B are front and rear perspective views, respectively, of an electronic device according to embodiments.

Referring to FIGS. 2A and 2B, an electronic device 200 (e.g., the electronic device 101 of FIG. 1) may include a housing 210 having a first surface (or front surface) 210A, a second surface (or rear surface) 210B, and a side surface 210C surrounding a space between the first surface 210A and the second surface 210B. Meanwhile, the structure of the housing 210 described above is merely an example, and in an embodiment (not shown), the housing 210 may refer to a structure that forms a portion of the first surface 210A, the second surface 210B, and the side surface 210C.

In an embodiment, the first surface 210A may be formed by a front plate 202 (e.g., a front plate 220 of FIG. 3) of which at least a portion is substantially transparent. For example, the front plate 202 may include a polymer plate or a glass plate including various coating layers.

In an embodiment, the second surface 210B may be formed by a rear plate 211 (e.g., a rear plate 280 of FIG. 3) that is substantially opaque. For example, the rear plate 211 may be formed of coated or colored glass, ceramic, polymer, metal materials (e.g., aluminum, stainless steel (STS), or magnesium) or a combination of at least two of the above materials. The side surface 210C may be coupled to the front plate 202 and the rear plate 211 and may be formed by a side bezel structure 218 (e.g., a frame structure 241 of FIG. 3) including metal and/or polymer.

In n embodiment, the rear plate 211 and the side bezel structure 218 may be integrally formed and may include the same material (e.g., a metal material such as aluminum).

In the illustrated embodiment, the front plate 202 may include two first areas 210D that are curved and extend seamlessly in a direction from a partial area of the first surface 210A toward the rear plate 211. The first areas 210D may be positioned at both ends of a long edge of the front plate 202.

In the illustrated embodiment, the rear plate 211 may include two second areas 210E that are curved and extend seamlessly in a direction from a partial area of the second surface 210B toward the front plate 202. The second areas 210E may be included at both ends of a long edge of the rear plate 211.

In an embodiment, the front plate 202 (or the rear plate 211) may include only one of the first areas 210D (or the second areas 210E). In an embodiment, the front plate 202 (or the rear plate 211) may not include a portion of the first areas 210D (or the second areas 210E).

In an embodiment, when viewed from a side surface of the electronic device 200, the side bezel structure 218 may have a first thickness (or width) in a direction of a side surface (e.g., a short side) not including the first areas 210D or the second areas 210E, and have a second thickness less than the first thickness in a direction of a side surface (e.g., a long side) including the first areas 210D or the second areas 210E. In various embodiments, the side bezel structure 218 may be integrally formed with the rear plate 211.

In an embodiment, the electronic device 200 may include at least one of a display 201 (e.g., a display 230 of FIG. 3), audio modules 203, 204, and 207, a sensor module (not shown), a second sensor module 206, camera modules 205 and 212, key input devices 217, a light-emitting element (not shown), and a connector hole 208. In an embodiment, the electronic device 200 may not include at least one (e.g., the key input devices 217 or the light-emitting element (not shown)) of the components, or may additionally include other components.

In an embodiment, the display 201 may be exposed (e.g., visible) through at least a portion of the front plate 202. For example, at least a portion of the display 201 may be visible through the front plate 202 including the first surface 210A and the first areas 210D of the side surface 210C. As used herein with reference to the display, the terms “exposed”, “visible”, “visually exposed”, or the like may be used interchangeably and include a display having a cover glass or cover layer.

In an embodiment, the display 201 may be formed in a shape substantially the same as an adjacent outer shape of the front plate 202. In an embodiment (not shown), to expand a visible area of the display 201, a distance between an outer periphery of the display 201 and an outer periphery of the front plate 202 may be substantially the same.

In an embodiment, a surface of the housing 210 (or the front plate 202) may include a screen display area in which the display 201 is visually exposed and displays content via pixels. For example, the screen display area may include the first surface 210A and the first areas 210D of the side surface.

In an embodiment (not shown), the display 201 may include a touch sensing circuit, a pressure sensor for measuring an intensity (pressure) of a touch, and/or a digitizer for detecting a magnetic-type stylus pen, or may be disposed adjacent thereto.

In an embodiment, the screen display areas 210A and 110D may include a sensing area 210F and/or a camera area 210G.

In an embodiment, the sensing area 210F may at least partially overlap the screen display areas 210A and 210D. The sensing area 210F may be an area for displaying content like the other area of the screen display areas 210A and 210D and additionally for transmitting an input signal related to the second sensor module 206.

In an embodiment, at least a portion of the second sensor module 206 may be disposed below the screen display areas 210A and 210D. The second sensor module 206 may form the sensing area 210F in at least a portion of the screen display areas 210A and 210D. The second sensor module 206 may be configured to receive the input signal transmitted through the sensing area 210F and generate an electrical signal based on the received input signal. For example, the input signal may have a designated physical quantity (e.g., heat, light, temperature, sound, pressure, or ultrasound). For example, the input signal may include a signal related to biometric information (e.g., a fingerprint) of a user.

For example, the second sensor module 206 may include an optical fingerprint sensor configured to receive light. For example, the second sensor module 206 may be configured to receive an optical signal that is emitted from a pixel included in the display 201, reflected by a fingerprint of a user, and transmitted through the sensing area 210F.

For example, the second sensor module 206 may include an ultrasonic fingerprint sensor configured to transmit and receive ultrasonic waves. For example, the second sensor module 206 may include a transmission module for transmitting an ultrasonic wave toward the fingerprint of the user and a reception module for receiving an ultrasonic wave that is reflected by a finger of the user and transmitted through the sensing area 210F.

In an embodiment, the camera area may at least partially overlap the screen display areas 210A and 210D. The camera area 210G may be an area (e.g., a transmissive area) for displaying content like the other area of the screen display areas 210A and 210D and additionally for transmitting an optical signal related to the first camera module 205. For example, the camera area 210G may be configured to display content like the other area of the screen display areas 210A and 210D when the first camera module 205 is not operating. In an embodiment, the camera area 210G of the display 201 may be formed of a transmissive area having a designated transmittance. For example, the transmissive area may be formed to have a transmittance in the range of approximately 20% to approximately 40%. The transmissive area may include an area having a lower pixel density and/or wiring density than a surrounding area.

In an embodiment, at least a portion of the first camera module 205 may be disposed below the screen display areas 210A and 210D and configured to receive light passing through the camera area 210G. For example, the light received by the first camera module 205 may include light reflected by or emitted from a subject. The first camera module 205 may be configured to generate an electrical signal related to an image based on the received light. The first camera module 205 may not be exposed through a surface (e.g., the front surface 210A) of the electronic device 200. For example, the first camera module 205 may be covered by content displayed in the camera area 210G. For example, an optical axis of a lens included in the first camera module 205 may be disposed to pass through the camera area 210G included in the display 201.

In an embodiment, the second camera module 212 may include a plurality of camera modules (e.g., a dual camera, a triple camera, or a quad camera). However, the second camera module 212 is not necessarily limited to including a plurality of camera modules and may include one camera module.

In an embodiment, the first camera module 205 and/or the second camera module 212 may include one or more lenses, an image sensor, and/or an image signal processor (ISP). A flash 213 may include, for example, a light-emitting diode (LED) or a xenon lamp. In an embodiment, two or more lenses (an infrared camera, a wide-angle lens, and a telephoto lens) and image sensors may be disposed in the housing to face a direction toward one surface (e.g., the second surface 210B) of the electronic device 200.

In an embodiment, a sensor module (not shown) may generate an electrical signal or a data value corresponding to an internal operating state of the electronic device 200 or an external environmental state. In an embodiment, a sensor module (not shown) may be disposed on the first surface 210A, the second surface 210B, or at least a portion of the side surface 210C (e.g., the first areas 210D and/or the second areas 210E) of the housing 210.

In various embodiments, the sensor module and/or the second sensor module 206 may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor. In various embodiments (not shown), the fingerprint sensor may be disposed on the second surface 210B.

In an embodiment, audio modules 203, 204, and 207 may include microphone holes 203 and 204 and a speaker hole 207.

In an embodiment, the microphone holes 203 and 204 may include a first microphone hole 203 formed in a partial area of the side surface 210C and a microphone hole 204 formed in a partial area of the second surface 210B. Microphones for obtaining external sounds may be arranged in the microphone holes 203 and 204 in the housing 210. The microphones may include a plurality of microphones to sense the direction of sounds. In an embodiment, the second microphone hole 204 formed in the partial area of the second surface 210B may be disposed adjacent to the camera modules 205 and 112. For example, the second microphone hole 204 may obtain a sound when the camera modules 205 and 112 are executed or other functions are executed.

In an embodiment, the speaker hole 207 may include a receiver hole for call (not shown). The speaker hole 207 may be formed in a portion of the side surface 210C of the electronic device 200. In an embodiment, the speaker hole 207 and the microphone hole 203 may be implemented as a single hole. Although not shown, the receiver hole for call (not shown) may be formed in another portion of the side surface 210C. For example, the receiver hole for call (not shown) may be formed in a portion (e.g., a portion facing a −Y-axial direction) of the side surface 210C in which the speaker hole 207 is formed and another portion (e.g., a portion facing a +Y-axial direction) of the facing side surface 210C.

In an embodiment, the electronic device 200 may include a speaker that is fluidly connected to the speaker hole 207. In an embodiment, the speaker may include a piezoelectric speaker without the speaker hole 207.

In an embodiment, the key input devices 217 may be disposed on the side surface 210C (e.g., the first areas 210D and/or the second areas 210E) of the housing 210. In an embodiment, the electronic device 200 may not include a portion or all of the key input devices 217, and the key input devices 217 that are not included may be implemented in other forms such as soft keys on the display 201. In an embodiment, the key input devices may include the second sensor module 206 which forms the sensing area 210F included in the screen display areas 210A and 210D.

In an embodiment, the connector hole 208 may accommodate a connector. The connector hole 208 may be disposed in the side surface 210C of the housing 210. For example, the connector hole 208 may be disposed in the side surface 210C to be adjacent to at least a portion of the audio module (e.g., the microphone hole 203 and the speaker hole 207). In an embodiment, the electronic device 200 may include the first connector hole 208 for accommodating a connector (e.g., a USB connector) for transmitting/receiving power and/or data to or from an external electronic device and/or a second connector hole (not shown) for accommodating a connector (e.g., an earphone jack) for transmitting/receiving audio signals to or from the external electronic device.

In an embodiment, the electronic device 200 may include the light-emitting element (not shown). For example, the light-emitting element (not shown) may be disposed on the first surface 210A of the housing 210. The light-emitting element (not shown) may provide state information of the electronic device 200 in the form of light. In an embodiment, the light-emitting element (not shown) may provide a light source that is linked to the operation of the first camera module 205. For example, the light-emitting element (not shown) may include a light-emitting diode (LED), an infrared (IR) LED, and/or a xenon lamp.

Figure 3:
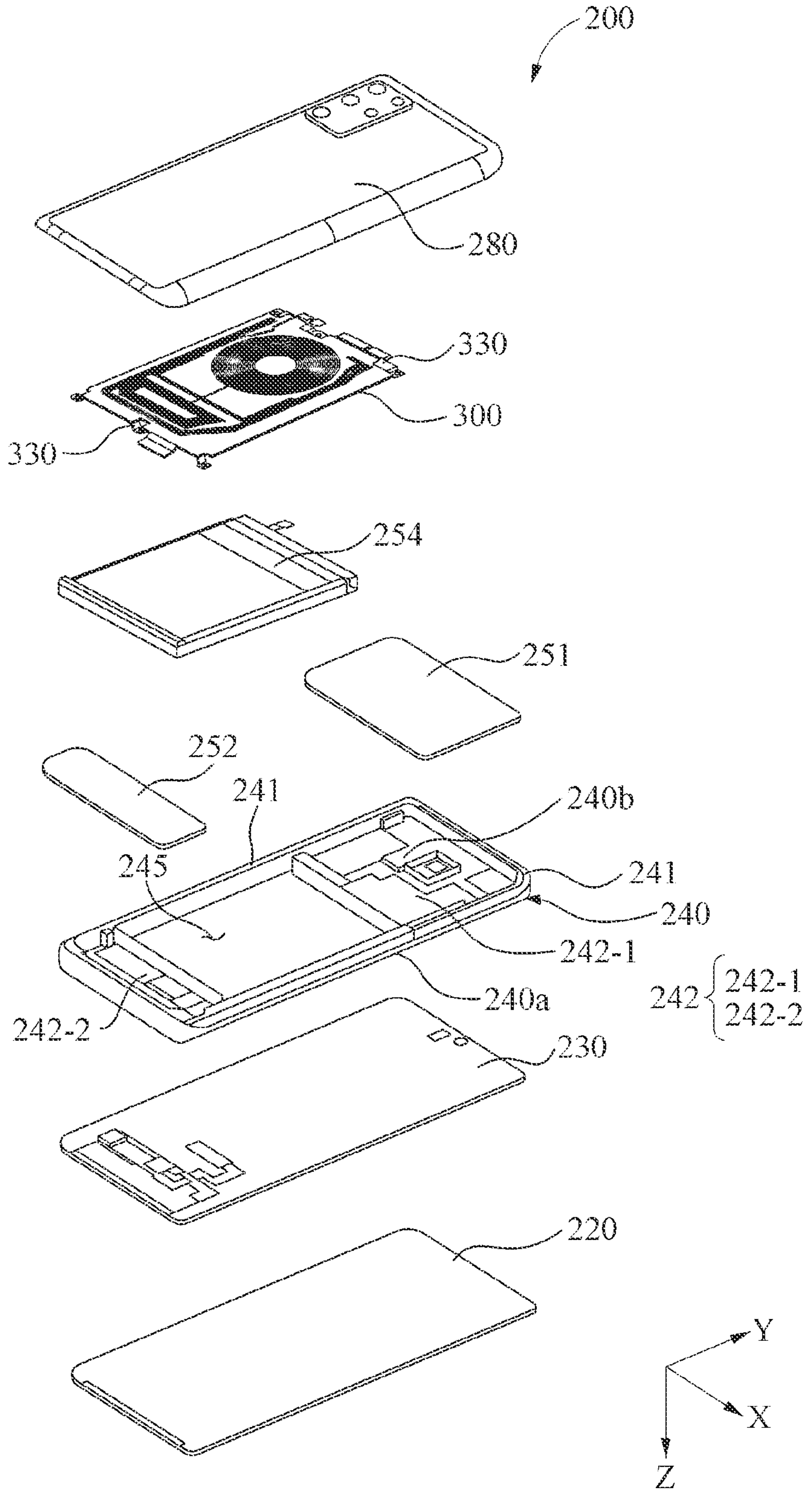
FIG. 3 is an exploded perspective view of an electronic device according to embodiments.

FIG. 3 is an exploded perspective view of an electronic device according to various embodiments.

Referring to FIG. 3, the electronic device 200 may include the front plate 220 (e.g., the front plate 202 of FIG. 1), the display 230 (e.g., the display 201 of FIG. 1), a first support member 240 (e.g., a bracket), a first circuit board 300, a second circuit board 251, a third circuit board 252, a battery 254, and the rear plate 280 (e.g., the rear plate 211 of FIG. 2B). In various embodiments, the electronic device 200 may omit at least one of the components or may additionally include other components. At least one of the components of the electronic device 200 may be the same as or similar to at least one of the components of the electronic device 200 of FIG. 1 or FIGS. 2A and 2B, and a repeated description thereof will be omitted hereinafter.

In various embodiments, the frame structure 241 of the front plate 220, the rear plate 280, and the first support member 240 may form a housing (e.g., the housing 210 of FIGS. 2A and 2B). In various embodiments, the front plate 220 and the display 230 may be referred to as a display module. For example, the front plate 220 may include at least one layer included in the display module.

In an embodiment, the support member 240 may include the frame structure 241 and a plate structure 242. In an embodiment, the frame structure 241 may be formed to surround a periphery of the plate structure 242. For example, the frame structure 241 may form a portion of the housing (e.g., the housing 210 of FIG. 1). For example, the frame structure 241 may surround a space between the front plate 220 and the rear plate 280 and form a portion of a surface (e.g., a side surface) of the electronic device 200. For example, the frame structure 241 may be formed to connect a periphery of the front plate 220 and a periphery of the rear plate 280. In an embodiment, the plate structure 242 may be a structure in which various structures included in the electronic device are disposed. For example, the display 230, the first circuit board 300, the second circuit board 251, and the third circuit board 252 may be disposed in the plate structure 242.

In an embodiment, the plate structure 242 of the support member 240 may include a first surface **240*a* at least partially facing the display 230 and a second surface 240*b* at least partially facing the rear plate 280. For example, the first surface 240*a* may be a surface facing a +z-axial direction, and the second surface 240*b* may be a surface facing a −z-axial direction. In an embodiment, an opening 245 penetrating through the first surface 240*a* and the second surface 240*b* may be formed in the plate structure 242. In an embodiment, at least a portion of the display 230 may be positioned on the first surface 240*a* of the plate structure 242. In an embodiment, at least a portion of each of the first circuit board 300, the second circuit board 251, and the third circuit board 252 may be positioned on the second surface 240*b* of the plate structure 242. In an embodiment, the battery 254 may be disposed in the opening 245 of the plate structure 242**.

In an embodiment, the plate structure 242 may include a first portion 242-1 defined on one side of the opening 245 and a second portion 242-2 defined on the other side of the opening 245. For example, the first portion 242-1 may be positioned in a +y-axial direction based on the opening 245, and the second portion 242-2 may be positioned in a −y-axial direction based on the opening 245. For example, at least a portion of the second circuit board 251 may be disposed on the first portion 242-1. For example, at least a portion of the third circuit board 252 may be disposed on the second portion 242-2.

In an embodiment, the battery 254, which is a device for supplying power to at least one component of the electronic device 200, may include, for example, a primary cell that is not rechargeable, a secondary cell that is rechargeable, or a fuel cell. In an embodiment, the battery 254 may be disposed in the opening 245 of the plate structure 242.

In an embodiment, when viewing the first surface **240*a* of the plate structure 242 from above, the battery 254 may be formed to be smaller than the opening 245 or to have substantially the same size as the opening 245. For example, when viewing the battery in the +z-axial direction, the battery 254 may be formed not to overlap the support member 240. For example, when viewed in the +z-axial direction, the battery 254 may not be supported by each of the frame structure 241, the first portion 242-1, and the second portion 242-2, which are peripheral portions of the opening 245**.

In an embodiment, when viewing the second surface **240*b* of the plate structure 242 from above, the battery 254 may be formed to be smaller than the opening 245 or to have substantially the same size as the opening 245. For example, when viewing the battery in the −z-axial direction, the battery 254 may be formed not to overlap the support member 240. For example, when viewed in the −z-axial direction, the battery 254 may not be supported by each of the frame structure 241, the first portion 242-1, and the second portion 242-2, which are peripheral portions of the opening 245**.

In an embodiment, the battery 254 may be attached to a surface of the first circuit board 300 facing the +z direction. For example, the battery 254 may be secured inside the opening 245 through the first circuit board 300.

In an embodiment, the first circuit board 300 may be disposed to at least partially cover the opening 245 of the plate structure 242. In an embodiment, the first circuit board 300 may electrically connect the second circuit board 251 and the third circuit board 252. For example, a conductive pattern for electrically connecting the second circuit board 251 and the third circuit board 252 may be formed on the first circuit board 300.

In an embodiment, the first circuit board 300 may be formed to be at least partially larger than the opening 245 when viewed in the +z-axial or −z-axial direction. For example, the first circuit board 300 may be formed to be longer than the opening 245 in the y-axial direction and/or the x-axial direction. For example, the first circuit board 300 may be coupled by at least one of the frame structure 241 and/or the first portion 242-1 and the second portion 242-2, which are peripheral portions of the opening 245.

In an embodiment, a securing bracket 330 may be coupled to a periphery of the first circuit board 300. The securing bracket 330 may be coupled to the first part 242-1, the second part 242-2, or the frame structure 241 of the plate structure 242. Thus, the first circuit board 300 may be secured and coupled to the support member 240. For example, the securing bracket 330 may be disposed at an +y-axial/−y-axial periphery of the first circuit board 300.

In an embodiment, an antenna pattern may be formed on the first circuit board 300. For example, the antenna pattern may be formed on a surface of the first circuit board 00 facing the rear plate 280. The antenna pattern may include, for example, a near-field communication (NFC) antenna, a wireless charging antenna, and/or a magnetic secure transmission (MST) antenna. For example, the antenna pattern may be configured to perform short-range communication with an external device or wirelessly transmit/receive the power needed for charging.

In an embodiment, a processor, a memory, and/or an interface may be disposed on the second circuit board 251 and the third circuit board 252. The processor may include, for example, one or more of a central processing unit, an application processor, a graphics processing unit, an image signal processor, a sensor hub processor, and a communication processor. In an embodiment, the interface may include, for example, an HDMI, a USB interface, an SD card interface, or an audio interface. For example, the interface may electrically or physically connect the electronic device 200 to an external electronic device, and may include a USB connector, an SD card/multimedia card (MMC) connector, or an audio connector.

In an embodiment, the memory may include, for example, a volatile memory or a non-volatile memory.

Figure 4:
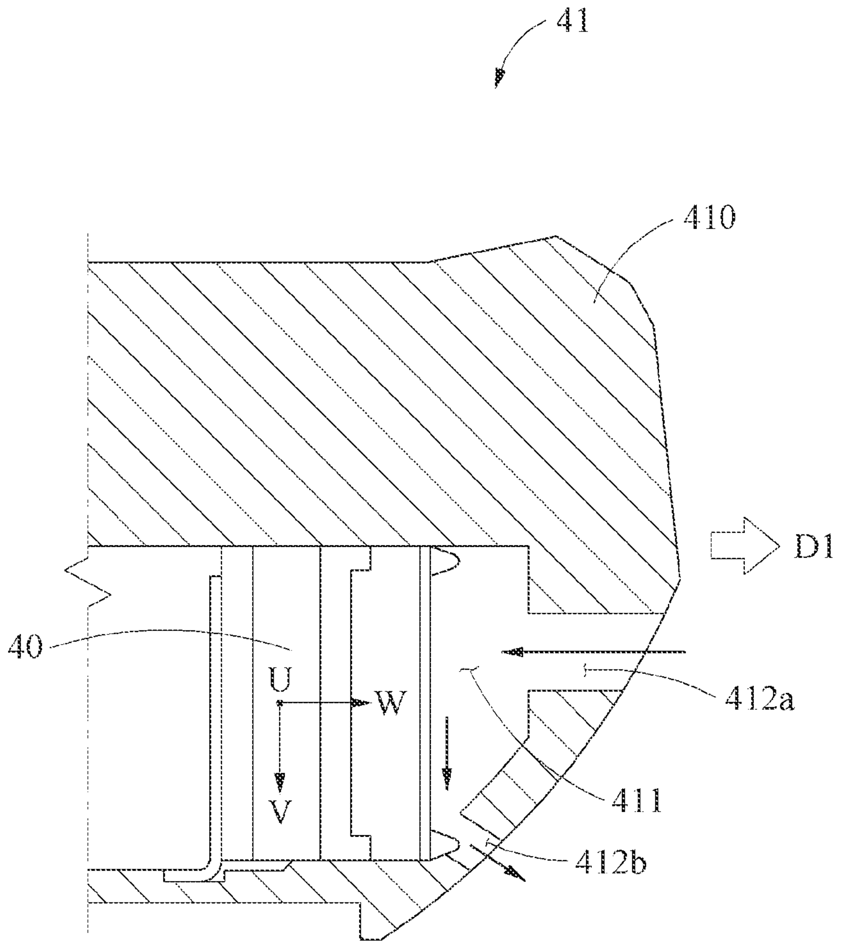
FIG. 4 is a cross-sectional view illustrating a state in which a sound component is disposed in an electronic device according to various embodiments.

FIG. 4 is a cross-sectional view illustrating a state in which a sound component is disposed in an electronic device according to various embodiments.

Referring to FIG. 4, a sound component 40 according to various embodiments may refer, for example, to a component that is mounted in an electronic device 41 (e.g., the electronic device 200 of FIG. 2A), and may emit a sound to the outside through a front surface, rear surface or side surface direction of the electronic device 41. For example, the sound component 40 may include a receiver or a speaker.

In an embodiment, the electronic device 41 may include a housing 410 forming the external appearance, and at least one sound hole 411 through which a sound is emitted may be formed in the housing 410. In an embodiment, the sound hole 411 may be formed on at least one of the front surface, the rear surface, or the side surface of the housing 410, and the sound component 40 may be mounted in the housing 410 to be adjacent to the sound hole 411. For example, the sound component 40 may be disposed inside the sound hole 411. In an embodiment, when a plurality of sound holes 411 are formed in the housing 410, a plurality of sound components 40 disposed to be adjacent respectively to the plurality of sound holes 411 may be mounted in the housing 410. In an embodiment, the sound component 40 may emit a sound in a first direction D1 (e.g., a +W-axial direction of FIG. 4) toward the outside of the housing 410 through the sound hole 411.

In an embodiment, the sound component 40 may include a sealing structure (e.g., including a seal) that implements a sealing function by contacting the housing 410. For example, in a state in which the sound component 40 is mounted in the sound hole 411 as shown in FIG. 4, the sound component 40 may come into contact with the housing 410 through the sealing structure, thereby blocking moisture or a foreign substance introduced through the sound hole 411 from entering the space between the housing 410 and the sound component 40.

In an embodiment, the housing 410 may include a plurality of through holes **412*a* and 412*b* communicating between the sound hole 411 and the outside. Since the space between the housing 410 and the sound component 40 is sealed through the sealing structure, moisture introduced into the sound hole 411 through the through hole 412*a* may be discharged to the outside of the housing 410 through the other through hole 412*b*. For example, as indicated by the arrows in FIG. 4, moisture introduced into the sound hole 411 may be discharged to the outside of the housing 410 through the plurality of through holes 412*a* and 412*b***.

Hereinafter, for ease of description, the configuration of the sound component 40 will be described based on a state in which the sound component 40 is disposed in the sound hole 411 as shown in FIG. 4. However, this is merely an example, and the arrangement relationship of the sound component 40 with respect to the housing 410 is not limited to that shown in FIG. 4.

Figure 5A:
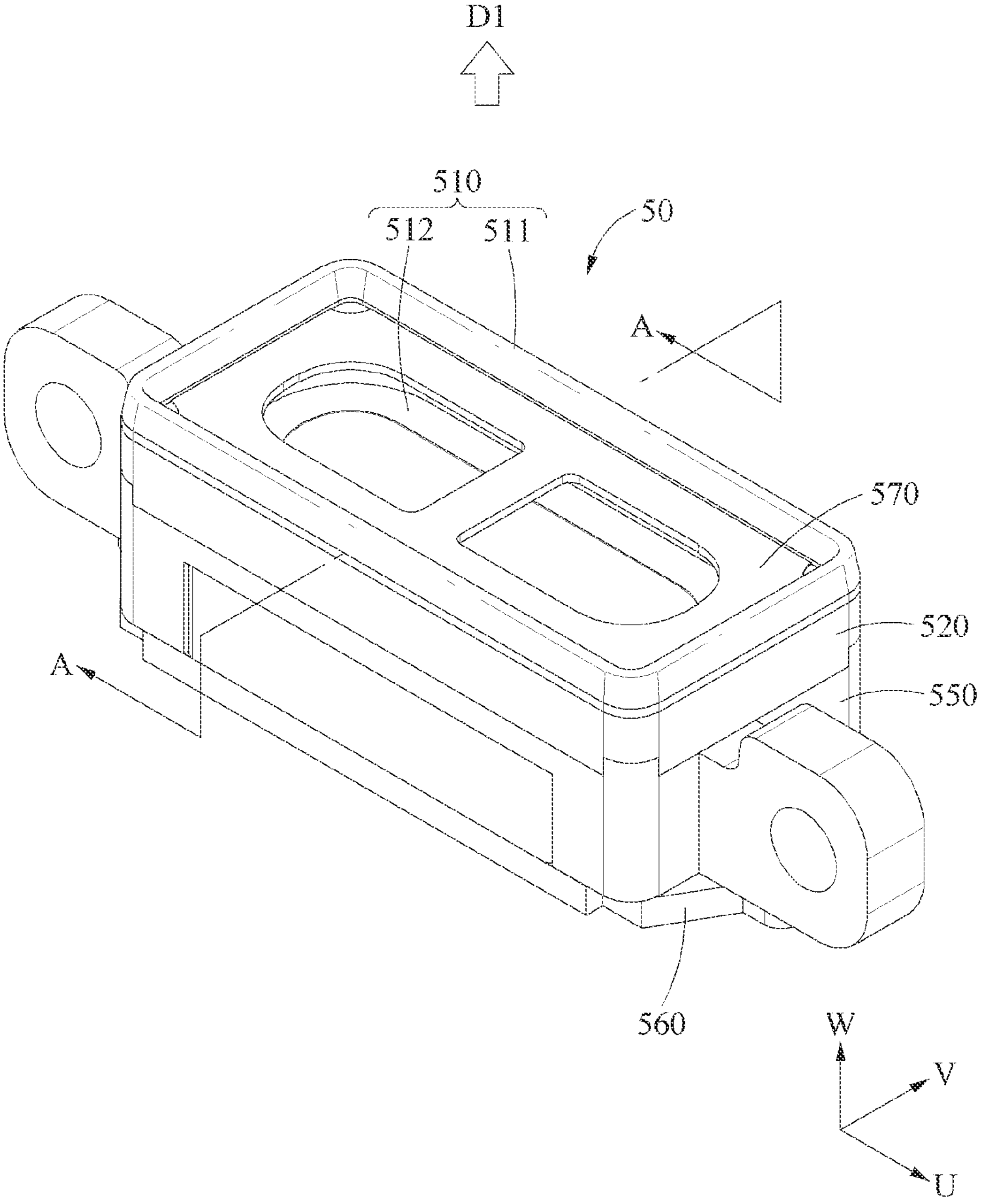
FIG. 5A is a perspective view of a sound component according to embodiments.
Figure 5B:
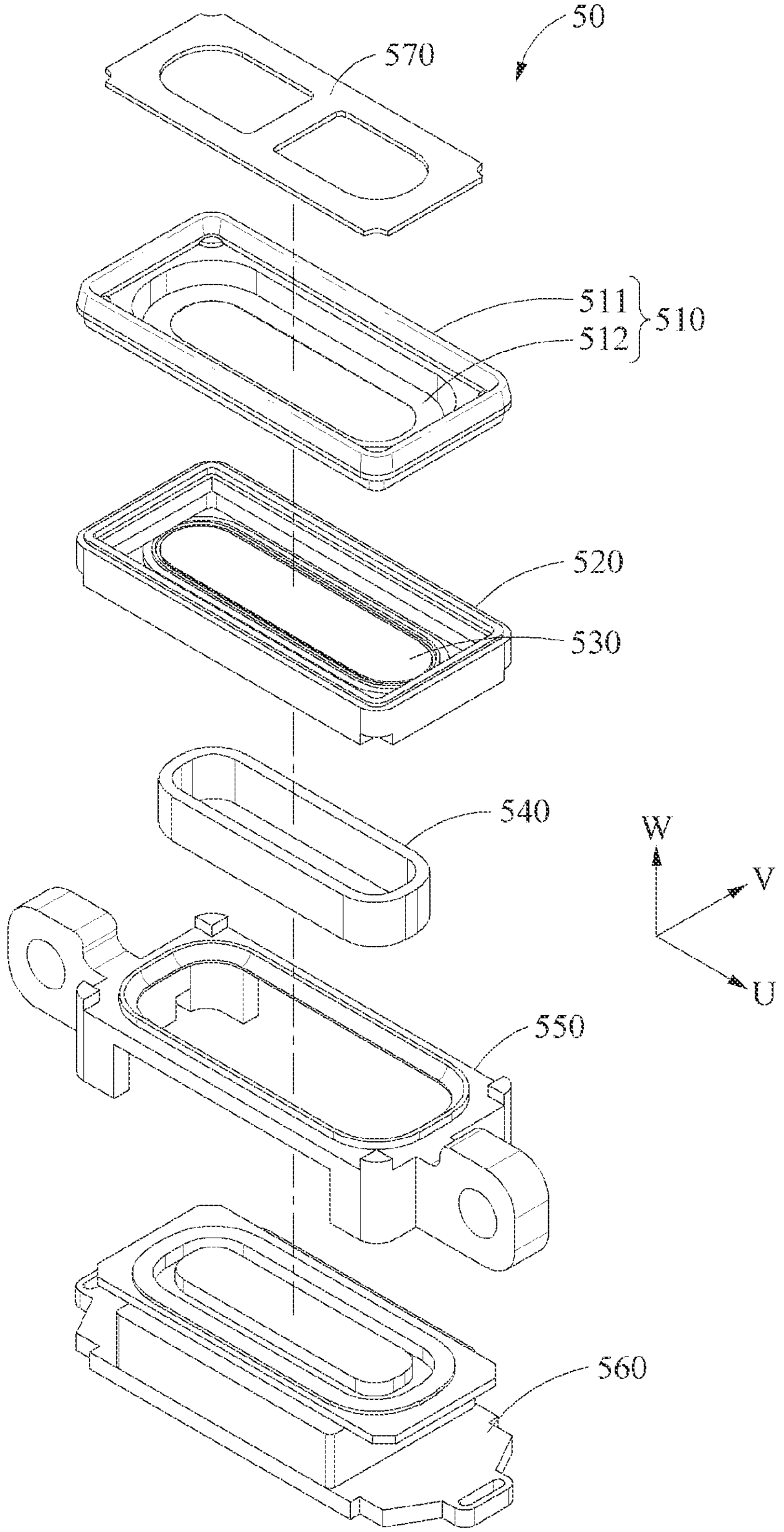
FIG. 5B is an exploded perspective view of a sound component according to embodiments.
Figure 5C:
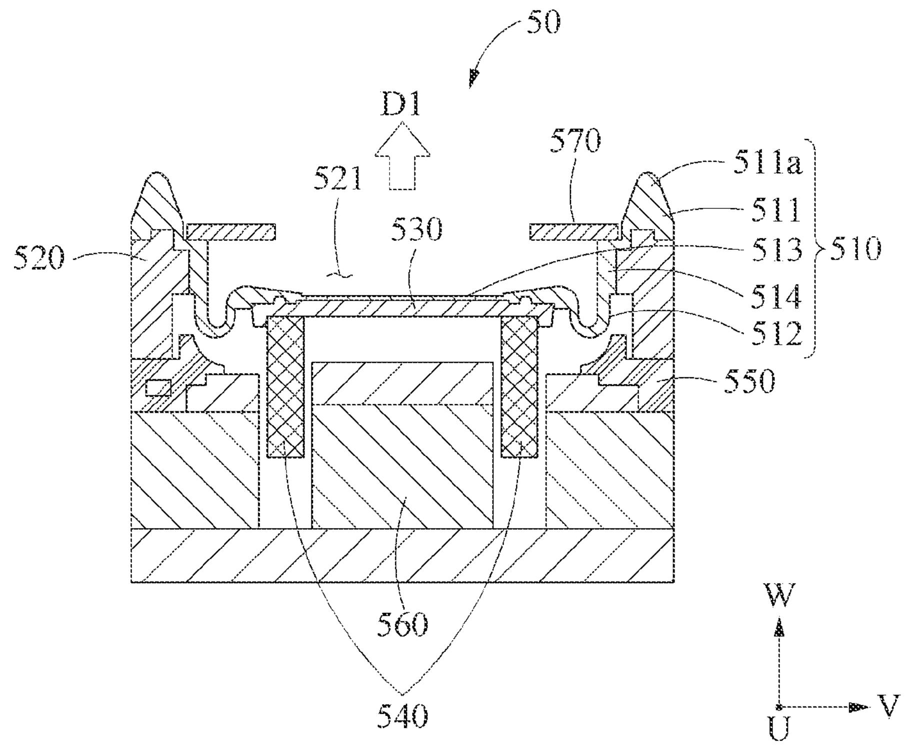
FIG. 5C is a cross-sectional view of the sound component of FIG. 5A taken along a line A-A according to embodiments.

FIG. 5A is a perspective view of a sound component according to embodiments, FIG. 5B is an exploded perspective view of the sound component according to embodiments, and FIG. 5C is a cross-sectional view of the sound component of FIG. 5A taken along a line A-A according to embodiments.

Referring to FIGS. 5A, 5B and 5C, a sound component 50 according to an embodiment may generate a sound according to an electrical signal and emit the generated sound to the outside of a sound hole. Hereinafter, based on a state in which the sound component 50 is mounted in the sound hole, a direction in which the sound component 50 emits a sound to the outside of the housing will be referred to as a first direction D1.

In an embodiment, the sound component 50 may include a sound frame 520, a center diaphragm 530, vibration modules 540 and 560, a sealing portion 510, a lower frame 550, and a protective grille 570.

In an embodiment, the sound frame 520 may form the external appearance of the sound component 50. The sound frame 520 may include a front space 521 formed therein. In a state in which the sound component 50 is mounted in the sound hole, the front space 521 formed by the sound frame 520 may be open toward the first direction D1. In this case, the sound frame 520 may be formed in a shape that surrounds the front space 521 based on a surface perpendicular to the first direction D1.

In an embodiment, the center diaphragm 530 may generate a sound wave according to vibration motion by receiving vibration applied by vibration modules which will be described in greater detail below. The center diaphragm 530 may be formed in a plate shape including a front surface and a rear surface. In an embodiment, the center diaphragm 530 may be disposed in the front space 521 so that the front surface thereof may face the first direction D1. In this case, the center diaphragm 530 may be disposed in a separated state so as not to contact the sound frame 520.

In an embodiment, the sound frame 520 and the center diaphragm 530 may include the same material. For example, the sound frame 520 and the center diaphragm 530 may include a plastic material such as polyphthalamide (PPA), polycarbonate (PC), or polyamide (PA), a metal material such as zinc, aluminum, tin, copper, or magnesium, or an alloy thereof. In an embodiment, since the sound frame 520 and the center diaphragm 530 include the same material, the sound frame 520 and the center diaphragm 530 may be formed simultaneously through an injection process. Accordingly, the process of manufacturing the sound frame 520 and the center diaphragm 530 may be simplified.

In an embodiment, the vibration modules 540 and 560 may be disposed on the rear surface of the center diaphragm 530 and apply vibration to the center diaphragm 530. The vibration modules may include a coil 540 that is connected to the rear surface of the center diaphragm 530 and forms a closed loop perpendicular to the first direction D1, and a magnetic field portion 560 that is disposed to be spaced apart from the rear surface of the center diaphragm 530 and applies a magnetic force to the coil 540. The vibration modules 540 and 560 may vibrate the center diaphragm 530 as operating according to a signal applied by a processor (e.g., the processor 120 of FIG. 1).

In an embodiment, the sealing portion 510 may connect the center diaphragm 530 and the sound frame 520. The sealing portion 510 may extend from the front surface of the center diaphragm 530 to the sound frame 520 and seal a space between the housing and the sound frame 520 through a portion connected to the sound frame 520. In an embodiment, the sealing portion 510 may include a vibration part 512, a sealing part 511, a connection part 514, and a cover part 513.

The vibration part 512 may connect the center diaphragm 530 and the sound frame 520 along the circumference of the center diaphragm 530. In an embodiment, the vibration part 512 may cover the front space 521 between the sound frame 520 and the center diaphragm 530 so as not to be exposed to the outside, based on a state in which the front surface of the center diaphragm 530 is viewed. In an embodiment, the vibration part 512 may be acoustically coupled to the center diaphragm 530 to vibrate. In other words, the vibration part 512 may function as a kind of side dome that vibrates together with the center diaphragm 530. At least a portion of the vibration part 512 may be bent. For example, the vibration part 512 may include a curved part that is bent in a second direction (e.g., a −W-axial direction) opposite to the first direction D1.

Figure 9:
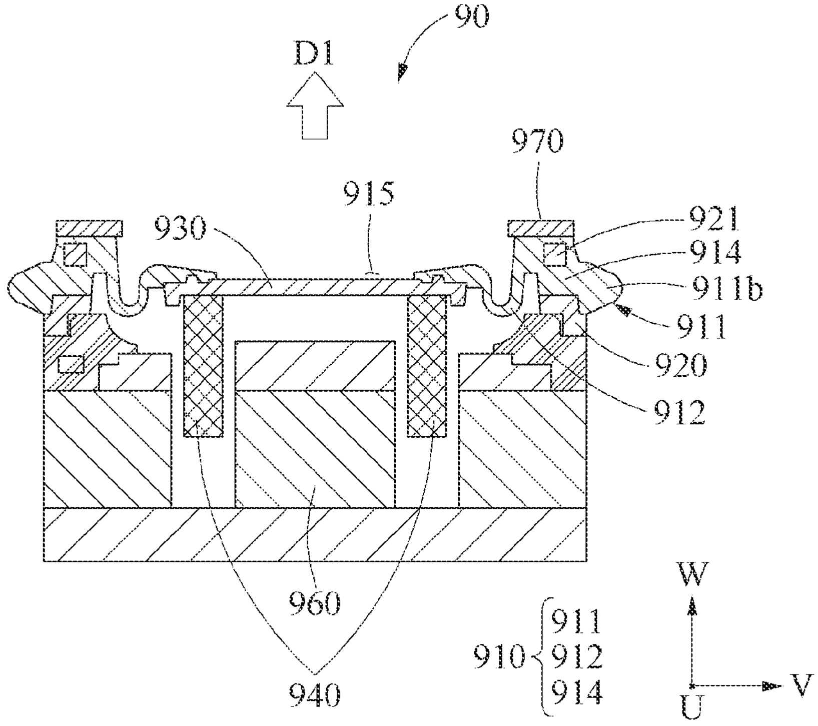
FIG. 9 is a cross-sectional view of a sound component according to embodiments.

The sealing part 511 may be a portion connected to the sound frame 520 to seal the space between the sound frame 520 and the housing. In an embodiment, the sealing part 511 may protrude from the sound frame 520 in at least one direction along the circumference of the sound frame 520, and may be compressed by contacting the housing through the protruding portion. For example, the sealing part 511 may include a first sealing part 511*a* protruding from the center diaphragm 530 in the first direction D1, as shown in FIG. 5C. However, unlike this, the sealing part 511 may include a second sealing part 511 protruding from the outer circumferential surface of the center diaphragm 530 in a second direction perpendicular to the first direction D1 as shown in FIG. 9, or may simultaneously include the first sealing part 511*a* and the second sealing part 511. In an embodiment, the sealing part 511 may be formed to have a shape in which the cross section thereof decreases in a direction away from the sound frame 520, for example, a substantially semicircular shape or a trapezoidal shape. According to this structure, when the sealing portion 510 is formed of a flexible material as described later, an end portion of the sealing part 511 may come into closer contact with the housing, thereby ensuring an effective sealing function.

The connection part 514 may connect the vibration part 512 and the sealing part 511. In an embodiment, since the vibration part 512 is connected to the inner circumferential surface of the sound frame 520, and the sealing part 511 is connected to an end portion of the sound frame 520 facing the first direction D1 or the outer circumferential surface of the sound frame 520 facing the second direction, the connection part 514 may be connected from the inner circumferential surface of the sound frame 520 to the end portion or the outer circumferential surface of the sound frame 520.

The cover part 513 may be connected to the front surface of the center diaphragm 530. In an embodiment, the vibration part 512 may be connected to a peripheral portion along the circumference of the center diaphragm 530, and the cover part 513 may fill the space between the vibration part 512, thereby covering the front surface of the center diaphragm 530. In other words, the cover part 513 may cover the front surface of the center diaphragm 530 to prevent and/or reduce the front surface of the center diaphragm 530 from being exposed in the first direction D1. This structure may allow the sealing portion 510 to prevent and/or reduce the center diaphragm 530 from being exposed to the outside in the first direction D1 and thereby prevent and/or reduce the center diaphragm 530 from being damaged by moisture or a foreign substance introduced from the outside.

In an embodiment, the cover part 513 may be formed to have a thinner thickness than the vibration part 512 based on the cross section as shown in FIG. 5C. While the vibration part 512 is formed in a curved suspension structure so as to be coupled to the center diaphragm 530 and vibrate, the cover part 513 is directly attached to the front surface of the center diaphragm 530, and thus, the cover part 513 may be formed to have a thinner thickness than the vibration part 512, thereby vibrating in accordance with the vibration of the center diaphragm 530. In addition, the structure described above may prevent and/or reduce the vibration force of the center diaphragm 530 from being weakened by the cover part 513.

In an embodiment, the sealing portion 510 may include a material different from that of the center diaphragm 530 and the sound frame 520. The sealing portion 510 may include a compressible flexible material such as, for example, liquid silicon rubber (LSR), silicon, or rubber material. When the sealing portion 510 is formed of a flexible material, the sealing part 511 may implement an effective sealing function by being compressed in a state of contacting the housing, and the vibration part 512 may vibrate effectively in accordance with the vibration of the center diaphragm 530.

In an embodiment, the sealing portion 510 may be integrally connected to the center diaphragm 530 and the sound frame 520 during the manufacturing process. For example, the sealing portion 510 may be integrally connected to the center diaphragm 530 and the sound frame 520 at the same time being molded through double injection. This manner may increase manufacturing efficiency by minimizing and/or reducing the required process in the process of connecting the sound frame 520, the center diaphragm 530, and the sealing portion 510 and lower the defect rate that occurs during the process of implementing a waterproof structure by omitting an attachment process.

In an embodiment, the lower frame 550 may be connected to the sound frame 520. The lower frame 550 may be connected to the sound frame 520 in a direction opposite to the first direction D1 and surround the circumference of the sound module. In an embodiment, the lower frame 550 may be directly fixed to the housing, thereby performing a function of fixing the position of the sound component 50 with respect to the housing.

In an embodiment, the protective grille 570 may be connected to the sealing portion 510 in the first direction D1. In a state in which the front surface of the center diaphragm 530 is viewed, the protective grille 570 may be exposed in the first direction D1 and cover the front space 521. In an embodiment, the protective grille 570 may be formed in a plate shape and may include a plurality of through holes penetrating through the surface as shown in FIG. 4 to allow a sound to pass from the front space 521 to the outside. On the other hand, the protective grille 570 may be formed in a grille shape (e.g., a mesh shape) in which a plurality of holes are formed. The protective grille 570 may allow the sound emitted from the front space 521 to pass to the outside at the same time preventing/reducing a foreign substance from entering the front space 521 from the outside. In an embodiment, the protective grille 570 may include a metal material, for example, a steel use stainless (SUS) material.

Figure 6:
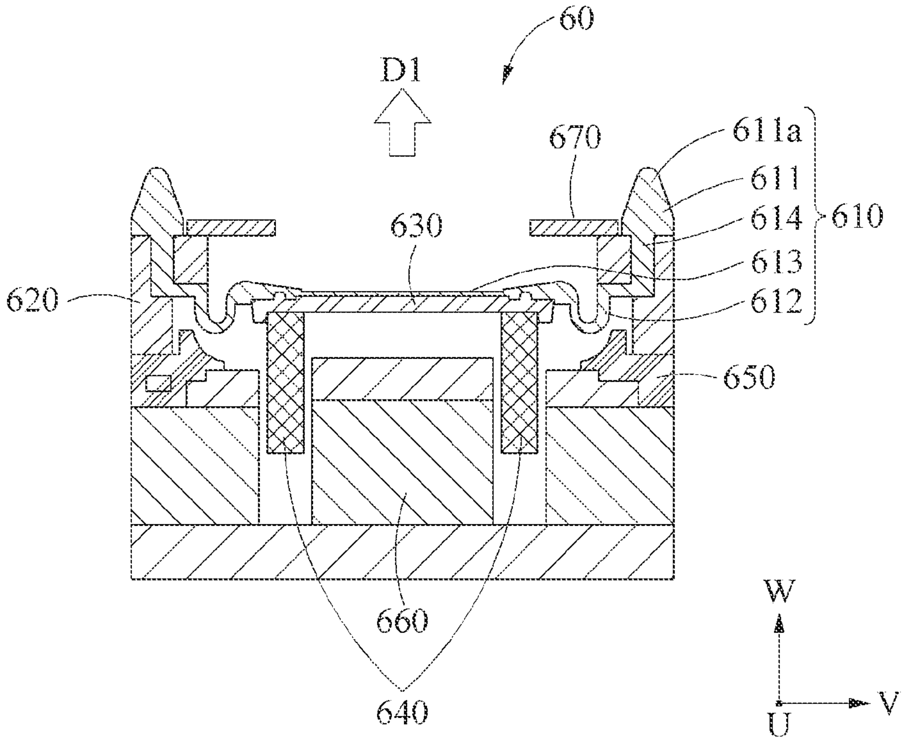
FIG. 6 is a cross-sectional view of a sound component according to embodiments.

FIG. 6 is a cross-sectional view of a sound component according to embodiments.

Referring to FIG. 6, a sound component 60 may include a sound frame 620, a center diaphragm 630, vibration modules 640 and 660, a sealing portion 610, a lower frame 650, and a protective grille 670.

The sound frame 620 and the center diaphragm 630 may be formed of the same material.

The sealing portion 610 may include a vibration part 612, a sealing part 611, a connection part 614, and a cover part 613.

The vibration part 612 may connect the center diaphragm 630 and the sound frame 620 along the circumference of the center diaphragm 630. In an embodiment, in a state in which a front surface of the center diaphragm 630 is viewed, the vibration part 612 may extend from a peripheral portion of the center diaphragm 630 to the sound frame 620. The vibration part 612 may be acoustically coupled to the vibration of the center diaphragm 630 and vibrate, and may include a curved portion that is bent in a direction (e.g., a −W-axial direction) opposite to a first direction D1.

The sealing part 611 may protrude from an end portion of the sound frame 620. For example, the sealing part 611 may include a first sealing part 611*a* protruding in the first direction D1. The first sealing part 611*a* may be formed along the circumference of the sound frame 620 and seal a space between the sound frame 620 and a housing (e.g., the housing 410 of FIG. 4) by contacting the housing.

The connection part 614 may connect the vibration part 612 and the sealing part 611. In an embodiment, the connection part 614 may connect the vibration part 612 and the sealing part 611 by passing through the sound frame 620. For example, the frame may include a connection hole penetrating the inside thereof from an end portion facing the first direction D1 to the inner circumferential surface, and the connection part 614 may be inserted into the connection hole. In an embodiment, since the sealing portion 610 is integrally connected to the sound frame 620 during the manufacturing process through double injection, the connection part 614 of the sealing portion 610 may penetrate through the sound frame 620 and be connected thereto. This structure may cause the sealing portion 610 and the sound frame 620 to have a solid coupling structure and thus, may prevent and/or reduce an issue of the sealing portion 610 and the sound frame 620 being disconnected by an external shock. In addition, a separate attachment process for attaching the sealing portion 610 and the sound frame 620 may be omitted.

In an embodiment, the protective grille 670 may be connected to an end portion of the sound frame 620 facing the first direction D1 so as to be exposed to the outside in the first direction D1.

Figure 7:
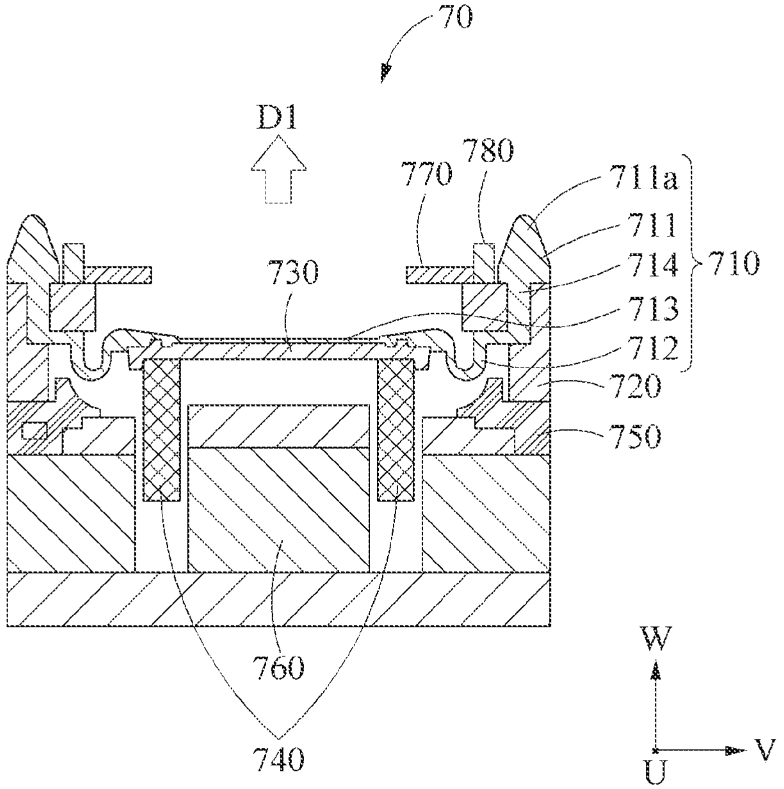
FIG. 7 is a cross-sectional view of a sound component according to embodiments.

FIG. 7 is a cross-sectional view of a sound component according to embodiments.

Referring to FIG. 7, a sound component 70 may include a sound frame 720, a center diaphragm 730, vibration modules 740 and 760, a sealing portion 710, a lower frame 750, a protective grille 770, and a stopper 780.

The sound frame 720 and the center diaphragm 730 may be formed of the same material.

The sealing portion 710 may include a vibration part 711, a sealing part 712, a connection part 714, and a cover part 713. In an embodiment, the vibration part 711 may extend from a peripheral portion of the center diaphragm 730 to the sound frame 720, and may be coupled to the vibration of the center diaphragm 730 and vibrate. The sealing part 712 may include a first sealing part 712*a* protruding from an end portion of the sound frame 720 facing a first direction D1 in the first direction D1. The first sealing part 712*a* may seal a space between a housing (e.g., the housing 410 of FIG. 4) and the sound frame 720 by being compressed in contact with the housing while the sound component 70 is mounted in the housing.

The stopper 780 may suppress the deformation of the first sealing part 712*a* according to compression. In an embodiment, the stopper 780 may be connected to the end portion of the sound frame 720 facing the first direction D1 so as to be disposed along the inner circumference of the first sealing part 712*a*, based on a state in which the front surface of the center diaphragm 730 is viewed. The stopper 780 may physically prevent and/or inhibit the first sealing part 712*a* from being pushed and deformed in an inward direction (e.g., a direction toward the center diaphragm 730) during the process in which the first sealing part 712*a* is compressed. This structure may prevent and/or inhibit the deformation of the first sealing part 712*a* by means of the stopper 780 and thus, effectively maintain the waterproof function of the first sealing part 712*a*.

Figure 8A:
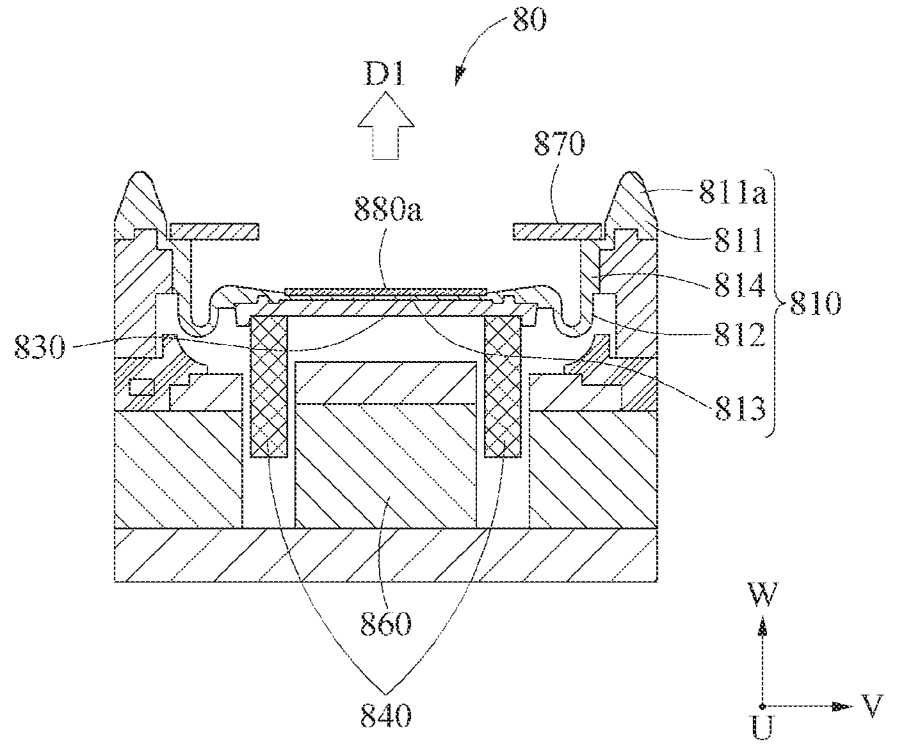
FIGS. 8A and 8B are cross-sectional views of a sound component according to embodiments.
Figure 8B:
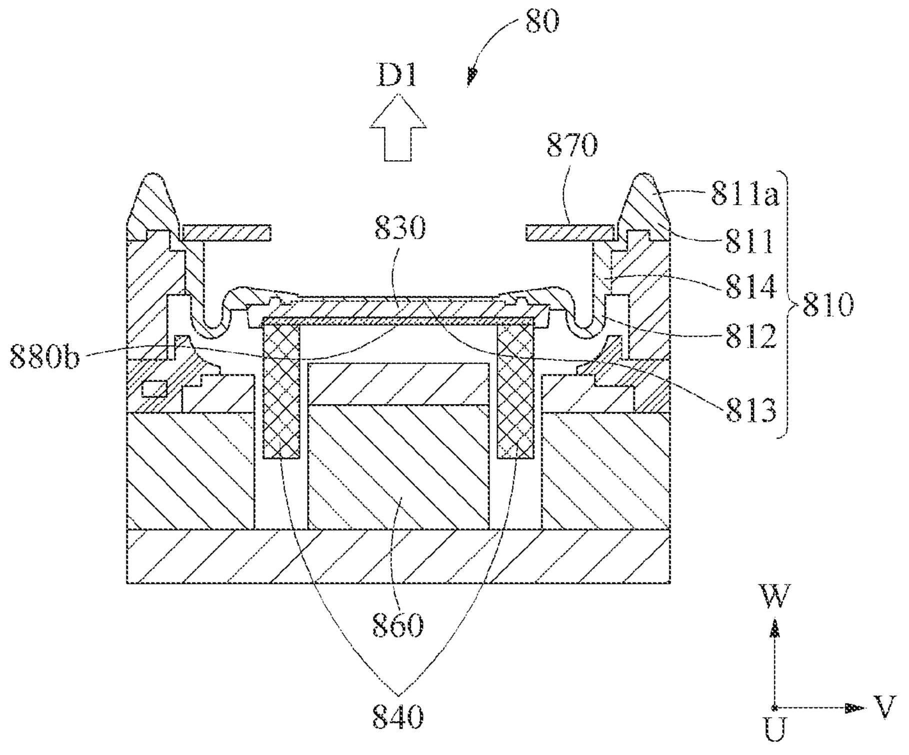

FIGS. 8A and 8B are cross-sectional views of a sound component according to embodiments.

Referring to FIGS. 8A and 8B, a sound component 80 according to an embodiment may include a sound frame 820, a center diaphragm 830, a sealing portion 810, vibration modules 840 and 860, a protective grille 870, and reinforcing members 880*a* and 880*b*.

The sealing portion 810 may include a vibration part 812 a sealing part 811, a connection part 814, and a cover part 813. In an embodiment, the vibration part 812 may extend from a peripheral portion of the center diaphragm 830 to the sound frame 820, and may be coupled to the vibration of the center diaphragm 830 and vibrate. The sealing part 811 may include a first sealing part 811*a* protruding from an end portion of the sound frame 820 facing a first direction D1 in the first direction D1. The first sealing part 811*a* may seal a space between a housing (e.g., the housing 410 of FIG. 4) and the sound frame 820 by being compressed in contact with the housing while the sound component 80 is mounted in the housing.

In an embodiment, the reinforcing members 880*a* and 880*b* may be disposed on at least one of a front surface or a rear surface of the center diaphragm 830. For example, the reinforcing member 880*a* may be disposed on the front surface of the center diaphragm 830 as shown in FIG. 8A. When the front surface of the center diaphragm 830 is covered by the cover part 813, the reinforcing member 880*a* may be attached to a front surface of the cover part 813 corresponding to the center diaphragm 830. In addition, the reinforcing member 880*b* may be attached to the center diaphragm 830 so as to be disposed on the rear surface of the center diaphragm 830 as shown in FIG. 8B. Meanwhile, the drawing illustrates only a case where the reinforcing members 880*a* and 880*b* are attached to one of the front surface or the rear surface of the center diaphragm 830, but unlike this, an embodiment in which the reinforcing members 880*a* and 880*b* are simultaneously attached to the front surface and the rear surface of the center diaphragm 830 is also possible. In an embodiment, the reinforcing members 880*a* and 880*b* may reinforce the strength of the center diaphragm 830 by being disposed on the center diaphragm 830. In an embodiment, the reinforcing members 880*a* and 880*b* may include a material such as polyether-ether-ketone (PEEK), polyetherimide (PEI), aluminum, magnesium, carbon, polycarbonate (PC), or polyphthalamide (PPA).

FIG. 9 is a cross-sectional view of a sound component according to embodiments.

Referring to FIG. 9, a sound component 90 may include a sound frame 920, a center diaphragm 930, vibration modules 940 and 960, a sealing portion 910, a lower frame 960, and a protective grille 970.

The sound frame 920 and the center diaphragm 930 may be formed of the same material.

The sealing portion 910 may include a vibration part 912, a sealing part 911, and a connection part 914.

In an embodiment, the vibration part 912 may extend from a peripheral portion of the center diaphragm 930 to the sound frame 920, and may be coupled to the vibration of the center diaphragm 930 and vibrate. The sealing part 911 may protrude from the sound frame 920 in one direction. For example, the sealing part 911 may include a second sealing part 911*b* protruding from the outer circumferential surface of the sound frame 920 in a second direction (e.g., a V-axial direction) perpendicular to a first direction D1. The second sealing part 911*b* may be formed along the circumference of the sound frame 920 and seal a space between the sound frame 920 and a housing (e.g., the housing 410 of FIG. 4) by contacting the housing.

The connection part 914 may connect the vibrating part 912 and the sealing part 911. In an embodiment, the connection part 914 may connect the vibration part 912 and the sealing part 911 by passing through the sound frame 920. For example, the sound frame 920 may include a connection hole penetrating the inside thereof from an end portion facing the first direction D1 to the inner circumferential surface, and the connection part 914 may be inserted into the connection hole. In an embodiment, since the sealing portion 910 is integrally connected to the sound frame 920 during the manufacturing process through double injection, the connection part 914 of the sealing portion 910 may penetrate through the sound frame 920 and be connected thereto. On the other hand, since the sealing portion 910 and the sound frame 920 are integrally connected through double injection, the sound frame 920 and the sealing portion 910 may be connected in a manner of forming an insertion hole in the sealing portion 910 and inserting an insertion part 921 of the sound frame 920 into the insertion hole. This structure may cause the sealing portion 910 and the sound frame 920 to have a solid coupling structure and thus, may prevent and/or reduce an issue of the sealing portion 910 and the sound frame 920 being disconnected by an external shock.

In an embodiment, the sealing portion 910 may include a center hole formed to be open so that the front surface of the center diaphragm 930 may be exposed in the first direction D1, based on a state in which the front surface of the center diaphragm 930 is viewed. In this case, the sealing portion 910 may extend to the sound frame 920 along a peripheral portion of the center diaphragm 930 with the center hole as the center. This structure may cause the center diaphragm 930 to vibrate effectively by the sound module.

Figure 10:
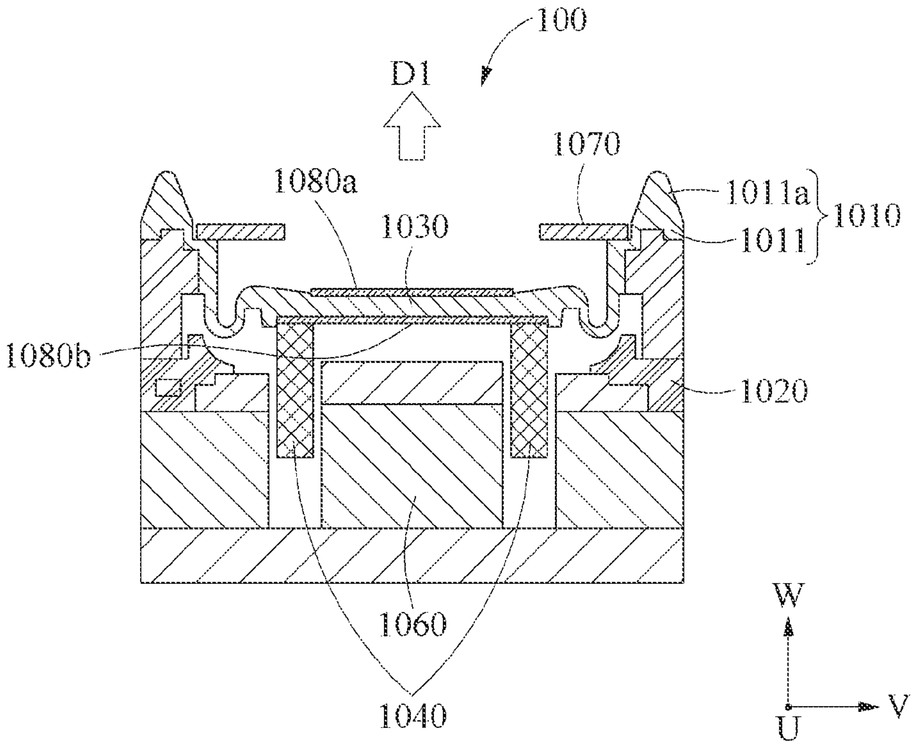
FIG. 10 is a cross-sectional view of a sound component according to embodiments.

FIG. 10 is a cross-sectional view of a sound component according to embodiments.

Referring to FIG. 10, a sound component 100 according to an embodiment may include a sound frame 1020, a center diaphragm 1030, a sealing portion 1010, vibration modules 1040 and 1060, a protective grille 1070, and reinforcing members 1080*a* and 1080*b*.

In an embodiment, the sound frame 1020, the center diaphragm 1030, and the sealing portion 1010 may be formed of the same material. In an embodiment, the center diaphragm 1030 and the sealing portion 1010 may be integrally formed. The center diaphragm 1030 and the sealing portion 1010 may be formed of the same material and formed as a single member through injection molding. According to this method, the sound frame 1020, the center diaphragm 1030, and the sealing portion 1010 may be manufactured through the same material in one process, the manufacturing process may be simplified and manufacturing costs may be reduced. Meanwhile, in the embodiment of FIG. 10, the center diaphragm 1030 and the sealing portion 1010 are configured as one member but will be described separately for convenience to describe their respective functions.

The center diaphragm 1030 may vibrate by receiving vibration from the vibration modules 1040 and 1060 and generate a sound wave according to a vibrating motion. The center diaphragm 1030 may be formed in a plate shape including a front surface and a rear surface. In an embodiment, the center diaphragm 1030 may be disposed so that the front surface thereof may face a first direction D1.

The sealing portion 1010 may extend from the circumference of the center diaphragm 1030 to the sound frame 1020. The other extending end of the sealing portion 1010 may be connected to the sound frame 1020. The sealing portion 1010 may extend from a peripheral portion of the center diaphragm 1030 to the sound frame 1020, and may be coupled to the vibration of the center diaphragm 830 and vibrate. A sealing part 1011 may include a first sealing part 1011*a* protruding from an end portion of the sound frame 1020 facing the first direction D1 in the first direction D1. The first sealing part 1011*a* may seal a space between a housing and the sound frame 100 by contacting the housing while the sound component 100 is mounted in the housing.

In an embodiment, the reinforcing members **1080*a* and 1080*b* may be disposed on at least one of a front surface or a rear surface of the center diaphragm 1030. For example, the reinforcing members 1080*a* and 1080*b* may include a first reinforcing member 1080*a* disposed on the front surface of the center diaphragm 1030 and a second reinforcing member 1080*b* disposed on the rear surface of the center diaphragm 1030. The reinforcing members 1080*a* and 1080*b* may be attached to the center diaphragm 1030 to reinforce the strength of the center diaphragm 1030 at the same time preventing and/or reducing the center diaphragm 1030** from being contaminated by a foreign substance and moisture.

Hereinafter, a method of manufacturing a sound module according to an embodiment will be described. In describing the method of manufacturing a sound module, it may be understood that like terms as mentioned above refer to like elements unless otherwise described. Meanwhile, in the present disclosure, the term "-operation" is not intended to limit the order of the process, and the term "-operation" may be understood as "-process" or "-step".

Figure 11:
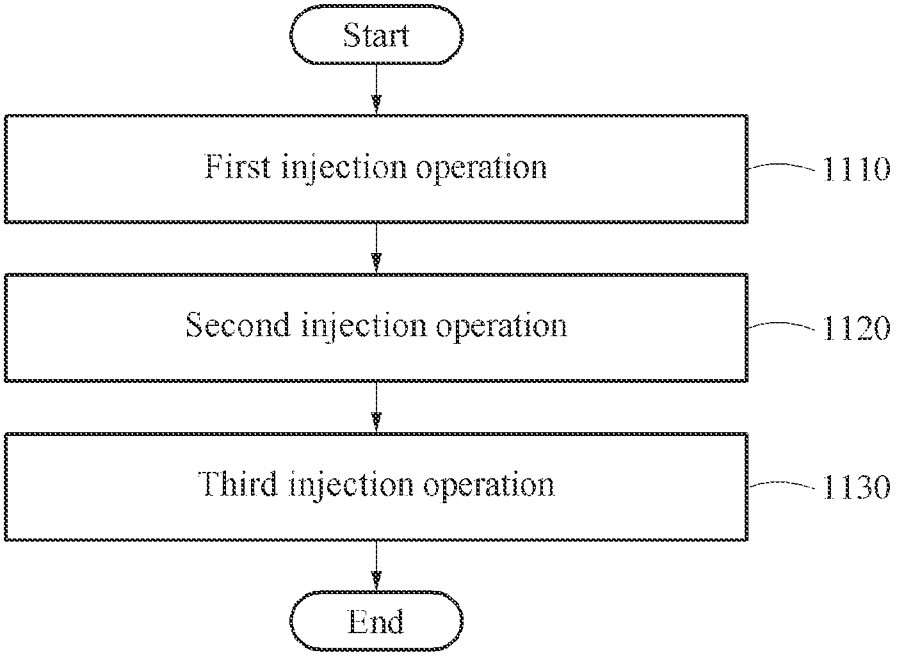
FIG. 11 is a flowchart illustrating an example sound component manufacturing method according to various embodiments.

FIG. 11 is a flowchart illustrating an example sound component manufacturing method according to embodiments.

Referring to FIG. 11, a method of manufacturing a sound component according to an embodiment may mold a sound module through double injection, the sound module including a sound frame configured to form a front space that is open in a first direction D1, a center diaphragm disposed in the front space such that a front surface thereof faces the first direction D1, and a vibration portion configured to connect the center diaphragm and the sound frame. The method of manufacturing a sound component according to an embodiment may include first injection operation 1110 of integrally molding the sound frame and the center diaphragm, second injection operation 1120 of molding the vibration portion, and third injection operation 1130 of attaching a reinforcing member.

First injection operation 1110 may integrally mold the sound frame and the center diaphragm by injecting a first material for primary molding, in a state in which a first moving mold is coupled to a fixed mold. The first material may include, for example, a plastic material such as polyphthalamide (PPA), polycarbonate (PC), or polyamide (PA), or a metal material. The first moving mold may be used to secure a space for forming a sound unit in the fixed mold.

Second injection operation 1120 may mold the vibration portion integrally connected to the sound frame and the center diaphragm by injecting a second material for secondary molding, in a state in which the first moving mold is decoupled from the fixed mold and a second moving mold is coupled to the fixed mold.

In an embodiment, in second injection operation 1120, the vibration portion may be formed to include a vibration part configured to connect the sound frame and the center diaphragm along the circumference of the center diaphragm, and a sealing part configured to protrude in at least one direction along the circumference of the sound frame.

After second injection operation 1120, third injection operation 1130 may attach a reinforcing member formed of a third material to one of a front surface or a rear surface of the center diaphragm.

According to various example embodiments, an electronic device 41 may include: a housing having at least one sound hole formed therein; and a sound component mounted on the housing adjacent to the sound hole and configured to emit a sound in a first direction toward the outside of the housing through the sound hole, wherein the sound component may include a sound frame configured to form a front space open in the first direction; a center diaphragm disposed in the front space such that a front surface thereof may face the first direction; a vibration module comprising at least one loop disposed on a rear surface of the center diaphragm and configured to apply vibration to the center diaphragm; and a sealing portion including a seal configured to connect the center diaphragm and the sound frame along a circumference of the center diaphragm and seal a space between the housing and the sound frame 520 through a portion connected to the sound frame, wherein the sound frame and the center diaphragm may include a same material.

In various example embodiments, based on a state in which the front surface of the center diaphragm is viewed, the sealing portion may include a vibration part configured to cover a space between the sound frame and the center diaphragm and acoustically coupled to the center diaphragm to vibrate; and a sealing part configured to protrude from the sound frame in at least one direction along a circumference of the sound frame and be compressed in contact with the housing.

In various example embodiments, the sealing portion may further include a cover part configured to cover the front surface of the center diaphragm to block the center diaphragm from being exposed in the first direction.

In various example embodiments, the sealing portion may further include, based on a state in which the front surface of the center diaphragm is viewed, a center hole formed to be open such that the front surface of the center diaphragm may be exposed.

In various example embodiments, the sealing part may include a first sealing part configured to protrude from the sound frame in the first direction.

In various example embodiments, the sound component may further include a stopper disposed along an inner circumference of the first sealing part based on a state in which the front surface of the center diaphragm is viewed, and configured to inhibit the first sealing part from being deformed in a direction of the center diaphragm.

In various example embodiments, the sealing part may include a second sealing part protruding from an outer circumferential surface of the sound frame in a second direction perpendicular to the first direction.

In various example embodiments, the sealing part may include a shape with a cross section decreasing in a direction away from the center diaphragm.

In various example embodiments, the sealing portion may further include a connection part configured to connect the sealing part and the vibration part by passing through the sound frame.

In various example embodiments, the sound frame and the center diaphragm may be simultaneously formed through an injection process.

In various example embodiments, the sealing portion may be integrally connected to the center diaphragm and the sound frame.

In various example embodiments, the sound component may further include a reinforcing member disposed on at least one of a front surface or a rear surface of the center diaphragm.

In various example embodiments, the sound component may further include a protective grille connected to the sealing portion to cover the front space and exposed in the first direction.

According to various example embodiments, a sound component mounted on an electronic device may include: a sound frame forming a front surface open in a first direction toward a sound hole formed in a housing of the electronic device, the sound frame including a first material; a center diaphragm comprising the first material, disposed in the front space such that a front surface thereof may face the first direction, and spaced apart from the sound frame; a sealing portion comprising a seal and including a vibration part configured to connect the center diaphragm and the sound frame along a circumference of the center diaphragm and acoustically coupled to the center diaphragm to vibrate, and a sealing part protruding from the sound frame and configured to seal a space between the housing and the sound frame; and a vibration module comprising a loop disposed on a rear surface of the center diaphragm and configured to apply vibration to the center diaphragm.

In various example embodiments, the sealing portion may further include a connection part configured to connect the sealing part and the vibration part by passing through the sound frame.

In various example embodiments, the sealing portion may be integrally connected to the sound frame and the center diaphragm.

In various example embodiments, the sealing part may include at least one of a first sealing part protruding from the sound frame in the first direction, and a second sealing part protruding from an outer circumferential surface of the sound frame in a second direction perpendicular to the first direction.

In various example embodiments, the sealing portion may further include a cover part connected to cover the center diaphragm to block the front surface of the center diaphragm from being exposed in the first direction.

In various example embodiments, the sealing portion may comprise the first material, and the center diaphragm and the sealing portion may be integrally formed.

According to various example embodiments, a sound module manufacturing method of molding a sound module through double injection, the sound module including a sound frame configured to form a front space that is open in a first direction, a center diaphragm disposed in the front space such that a front surface thereof may face the first direction, and a vibration portion configured to connect the center diaphragm and the sound frame may include: a first injection operation of integrally molding the sound frame and the center diaphragm by injecting a first material for primary molding, in a state in which a first moving mold is coupled to a fixed mold; and a second injection operation of molding the vibration portion integrally connected to the sound frame and the center diaphragm by injecting a second material for secondary molding, in a state in which the first moving mold is decoupled from the fixed mold and a second moving mold is coupled to the fixed mold, wherein in the second injection operation, the vibration portion may be formed to include a vibration part configured to connect the sound frame and the center diaphragm along a circumference of the center diaphragm, and a sealing part configured to protrude in at least one direction along a circumference of the sound frame.

In various example embodiments, the sound module manufacturing method may further include, after the second injection operation, a third injection operation of attaching a reinforcing member formed of a third material to one of a front surface or a rear surface of the center diaphragm.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing having at least one sound hole formed therein; and a sound component mounted on the housing adjacent to the sound hole and configured to emit a sound in a first direction toward an outside of the housing through the sound hole, wherein the sound component comprises:

a sound frame configured to form a front space open in the first direction;

a center diaphragm disposed in the front space such that a front surface thereof faces the first direction;

a vibration module including a loop disposed on a rear surface of the center diaphragm and configured to apply vibration to the center diaphragm; and a sealing portion comprising a seal and configured to connect the center diaphragm and the sound frame along a circumference of the center diaphragm and seal a space between the housing and the sound frame through a portion connected to the sound frame, wherein the sound frame and the center diaphragm comprise a same material.

2. The electronic device of claim 1, wherein based on a state in which the front surface of the center diaphragm is viewed, the sealing portion comprises:

a vibration part covering a space between the sound frame and the center diaphragm and acoustically coupled to the center diaphragm and configured to vibrate; and a sealing part protruding from the sound frame in at least one direction along a circumference of the sound frame and configured to be compressed in contact with the housing.

3. The electronic device of claim 2, wherein the sealing portion further comprises a cover part configured to at least partially cover the front surface of the center diaphragm to block the center diaphragm from being exposed in the first direction.

4. The electronic device of claim 2, wherein the sealing portion further comprises, based on a state in which the front surface of the center diaphragm is viewed, a center hole formed to be open such that the front surface of the center diaphragm is exposed.

5. The electronic device of claim 2, wherein the sealing part comprises a first sealing part protruding from the sound frame in the first direction.

6. The electronic device of claim 5, further comprising:

a stopper disposed along an inner circumference of the first sealing part based on a state in which the front surface of the center diaphragm is viewed, and configured to inhibit the first sealing part from being deformed in a direction of the center diaphragm.

7. The electronic device of claim 2, wherein the sealing part comprises a second sealing part protruding from an outer circumferential surface of the sound frame in a second direction perpendicular to the first direction.

8. The electronic device of claim 2, wherein the sealing part has a cross-sectional shape decreasing in a direction away from the sound frame.

9. The electronic device of claim 2, wherein the sealing portion further comprises a connection part configured to connect the sealing part and the vibration part by passing through the sound frame.

10. The electronic device of claim 1, wherein the sound frame and the center diaphragm are simultaneously formed through an injection process.

11. The electronic device of claim 1, wherein the sealing portion is integrally connected to the center diaphragm and the sound frame.

12. The electronic device of claim 1, wherein the sound component further comprises a reinforcing member comprising a reinforcement material disposed on at least one of a front surface or a rear surface of the center diaphragm.

13. The electronic device of claim 1, wherein the sound component further comprises a protective grille connected to the sealing portion to cover the front space and exposed in the first direction.

14. A sound module manufacturing method of molding a sound module through double injection, the sound module comprising a sound frame configured to form a front space that is open in a first direction, a center diaphragm disposed in the front space such that a front surface thereof faces the first direction, and a vibration portion configured to connect the center diaphragm and the sound frame, the sound module manufacturing method comprising:

a first injection operation of integrally molding the sound frame and the center diaphragm by injecting a first material for primary molding, in a state in which a first moving mold is coupled to a fixed mold; and a second injection operation of molding the vibration portion integrally connected to the sound frame and the center diaphragm by injecting a second material for secondary molding, in a state in which the first moving mold is decoupled from the fixed mold and a second moving mold is coupled to the fixed mold, wherein in the second injection operation, the vibration portion is formed to comprise a vibration part configured to connect the sound frame and the center diaphragm along a circumference of the center diaphragm, and a sealing part configured to protrude in at least one direction along a circumference of the sound frame.

15. The sound module manufacturing method of claim 14, further comprising:

after the second injection operation, a third injection operation of attaching a reinforcing member formed of a third material to one of a front surface or a rear surface of the center diaphragm.

16. A sound component mounted on an electronic device comprising:

a sound frame forming a front surface open in a first direction toward a sound hole formed in a housing of the electronic device, the sound frame including a first material;

a center diaphragm comprising the first material, disposed in the front space such that a front surface thereof may face the first direction, and spaced apart from the sound frame;

a sealing portion comprising a seal and including a vibration part configured to connect the center diaphragm and the sound frame along a circumference of the center diaphragm and acoustically coupled to the center diaphragm to vibrate, and a sealing part protruding from the sound frame and configured to seal a space between the housing and the sound frame; and a vibration module comprising a loop disposed on a rear surface of the center diaphragm and configured to apply vibration to the center diaphragm.

17. The sound component of claim 16, wherein the sealing portion further includes a connection part configured to connect the sealing part and the vibration part by passing through the sound frame.

18. The sound component of claim 17, wherein the sealing portion may be integrally connected to the sound frame and the center diaphragm.

19. The sound component of claim 16, wherein the sealing part including at least one of a first sealing part protruding from the sound frame in the first direction, and a second sealing part protruding from an outer circumferential surface of the sound frame in a second direction perpendicular to the first direction.

20. The sound component of claim 16, wherein the sealing portion further including a cover part connected to cover the center diaphragm to block the front surface of the center diaphragm from being exposed in the first direction.

* * * * *